(12) United States Patent
Chang

(10) Patent No.: US 10,966,487 B2
(45) Date of Patent: Apr. 6, 2021

(54) METHOD OF MAKING A KNITTED SHOE HAVING A TUBULAR KNITTED UPPER

(71) Applicant: Shuang Bang Industrial Corp., Nantou (TW)

(72) Inventor: Chung-Tang Chang, Nantou (TW)

(73) Assignee: SHUANG BANG INDUSTRIAL CORP., Nantou (TW)

( * ) Notice: Subject to any disclaimer, the term of this patent is extended or adjusted under 35 U.S.C. 154(b) by 408 days.

(21) Appl. No.: 15/794,045

(22) Filed: Oct. 26, 2017

(65) Prior Publication Data

US 2019/0098961 A1    Apr. 4, 2019

(30) Foreign Application Priority Data

Sep. 29, 2017    (TW) .................................. 106133631

(51) Int. Cl.
| | |
|---|---|
| *A43B 23/02* | (2006.01) |
| *A43B 23/04* | (2006.01) |
| *B32B 5/24* | (2006.01) |
| *A43D 3/02* | (2006.01) |
| *A43D 25/20* | (2006.01) |
| *A43D 86/00* | (2006.01) |
| *A43D 95/12* | (2006.01) |

(52) U.S. Cl.
CPC ........ *A43B 23/0205* (2013.01); *A43B 23/022* (2013.01); *A43B 23/0235* (2013.01); *A43B 23/0255* (2013.01); *A43B 23/04* (2013.01); *B32B 5/245* (2013.01); *A43D 3/02* (2013.01); *A43D 25/20* (2013.01); *A43D 86/00* (2013.01); *A43D 95/12* (2013.01)

(58) Field of Classification Search
CPC ..... A43B 1/04; A43B 23/0245; A43B 23/026; A43B 3/02; A43B 23/0255; A43B 23/04; A43B 23/022; A43B 23/0235; A43B 23/0205; A43D 95/12; A43D 25/20; B32B 2437/02; B32B 37/12; B32B 33/00; B32B 7/12; B32B 5/18; B32B 5/02; D04B 9/56
USPC .......................................................... 2/239
See application file for complete search history.

(56) References Cited

U.S. PATENT DOCUMENTS

| | | | | |
|---|---|---|---|---|
| 226,878 | A * | 4/1880 | Pope ........................ | D04B 1/26 66/187 |
| 234,074 | A * | 11/1880 | Scott ........................ | D04B 1/26 66/187 |
| 1,741,340 | A * | 12/1929 | Scholl .................. | A41B 11/006 2/239 |

(Continued)

*Primary Examiner* — Katharine G Kane
(74) *Attorney, Agent, or Firm* — Hamre, Schumann, Mueller & Larson, P.C.

(57) ABSTRACT

A method of making a knitted shoe includes the steps of: (A) preparing a tube main body having opposite first and second openings; (B) closing the first opening to form a front joined part; (C) cutting an oval shaped opening in the tube main body and closing the same to form a side joined part proximate to the front joined part; (D) preparing and sleeving a three-dimensional rigid foam sleeve on a shoe last; (E) adhering the tube main body to an outer surface of the foam sleeve so as to form a tubular knitted upper; (F) placing the shoe last in an oven for heating; (G) removing the shoe last from the oven; (H) adhering a sole to a bottom side of the tubular knitted upper; and (I) removing the shoe last from the tubular knitted upper.

10 Claims, 14 Drawing Sheets

(56) References Cited

U.S. PATENT DOCUMENTS

| Patent/Pub No. | Kind | Date | Inventor | Classification |
|---|---|---|---|---|
| 1,810,098 | A * | 6/1931 | Allen | D04B 9/46 66/187 |
| 2,333,373 | A * | 11/1943 | Grey | D04B 1/106 66/171 |
| 2,790,975 | A * | 5/1957 | McCormick | A41B 11/00 2/239 |
| 3,015,942 | A * | 1/1962 | Getaz | A41B 11/00 66/186 |
| 3,457,739 | A * | 7/1969 | Frand | D04B 1/26 66/202 |
| 3,694,940 | A * | 10/1972 | Stohr | A43B 7/34 36/10 |
| 3,921,313 | A * | 11/1975 | Mahide | A43B 1/0072 36/4 |
| 3,975,929 | A * | 8/1976 | Fregeolle | D04B 1/18 602/63 |
| 4,020,570 | A * | 5/1977 | Shames | A43B 17/14 36/44 |
| 4,021,860 | A * | 5/1977 | Swallow | A41B 11/008 2/239 |
| 4,599,810 | A * | 7/1986 | Sacre | A43B 7/125 36/55 |
| 4,961,235 | A * | 10/1990 | Williger | A41B 11/006 2/239 |
| 4,967,494 | A * | 11/1990 | Johnson | A41B 11/005 2/239 |
| 5,086,518 | A * | 2/1992 | Staley | D04B 1/26 2/239 |
| 5,412,957 | A * | 5/1995 | Bradberry | A61F 13/08 2/239 |
| 5,575,013 | A * | 11/1996 | Krack | A41B 11/00 2/239 |
| 5,659,914 | A * | 8/1997 | Steinlauf | A43B 23/07 12/145 |
| 5,682,617 | A * | 11/1997 | Tumas | A41B 11/00 2/239 |
| 5,708,984 | A * | 1/1998 | Shofner | A41B 11/001 2/239 |
| 5,778,702 | A * | 7/1998 | Wrightenberry | A41B 11/005 66/178 R |
| 6,029,376 | A * | 2/2000 | Cass | A43C 1/04 36/50.1 |
| 6,158,254 | A * | 12/2000 | Richard | A41B 11/005 2/239 |
| 6,173,589 | B1 * | 1/2001 | Hayes, Jr. | A41B 11/10 2/239 |
| 6,446,360 | B1 * | 9/2002 | Sheets | A43B 23/022 36/55 |
| 6,735,988 | B1 * | 5/2004 | Honeycutt | A41B 11/00 2/239 |
| 7,682,326 | B2 * | 3/2010 | Song | A43B 5/00 2/239 |
| D701,038 | S * | 3/2014 | Jones | D2/980 |
| 2002/0012784 | A1 * | 1/2002 | Norton | A43B 5/002 428/304.4 |
| 2002/0108166 | A1 * | 8/2002 | Abboud | A41B 11/14 2/239 |
| 2005/0115284 | A1 * | 6/2005 | Dua | A43B 1/04 66/178 R |
| 2006/0112594 | A1 * | 6/2006 | Kilgore | A43B 23/0235 36/45 |
| 2007/0022627 | A1 * | 2/2007 | Sokolowski | A43B 1/04 36/3 A |
| 2007/0199210 | A1 * | 8/2007 | Vattes | A43B 13/12 36/45 |
| 2010/0077634 | A1 * | 4/2010 | Bell | A41D 27/24 36/54 |
| 2010/0229429 | A1 * | 9/2010 | Longuet | A43B 7/085 36/3 R |
| 2011/0225845 | A1 * | 9/2011 | Dean | A43B 3/0078 36/83 |
| 2011/0245748 | A1 * | 10/2011 | Rinke | A61F 13/00063 602/43 |
| 2011/0289797 | A1 * | 12/2011 | Madelaine | A43B 3/103 36/88 |
| 2012/0297643 | A1 * | 11/2012 | Shaffer | A43B 1/0027 36/83 |
| 2013/0047471 | A1 * | 2/2013 | Liang | A43D 86/00 36/136 |
| 2013/0305465 | A1 * | 11/2013 | Siegismund | A43B 9/12 12/146 C |
| 2014/0059886 | A1 * | 3/2014 | Lyttle | A43B 1/00 36/55 |
| 2014/0082905 | A1 * | 3/2014 | Wen | D03D 3/02 28/142 |
| 2014/0137434 | A1 * | 5/2014 | Craig | A43B 1/04 36/54 |
| 2014/0259760 | A1 * | 9/2014 | Dojan | A43B 23/026 36/45 |
| 2014/0352173 | A1 * | 12/2014 | Bell | A43B 1/00 36/50.1 |
| 2015/0007452 | A1 * | 1/2015 | Hsieh | A43B 1/04 36/87 |
| 2015/0013187 | A1 * | 1/2015 | Taniguchi | A43B 1/04 36/84 |
| 2015/0128449 | A1 * | 5/2015 | Lin | D04B 1/22 36/84 |
| 2015/0150335 | A1 * | 6/2015 | Healy | A43B 7/12 36/87 |
| 2015/0189945 | A1 * | 7/2015 | Liang | A43B 23/026 36/45 |
| 2015/0189952 | A1 * | 7/2015 | Liang | A43B 23/0235 36/45 |
| 2015/0230544 | A1 * | 8/2015 | Bacino | A43B 7/125 36/87 |
| 2015/0289592 | A1 * | 10/2015 | Song | A43B 1/0072 36/83 |
| 2015/0313316 | A1 * | 11/2015 | Boucher | A43B 23/042 36/93 |
| 2015/0342296 | A1 * | 12/2015 | Skaja | A43B 9/12 36/83 |
| 2016/0166010 | A1 * | 6/2016 | Bruce | D04C 3/48 12/133 R |
| 2016/0166011 | A1 * | 6/2016 | Bruce | A43D 3/02 12/51 |

* cited by examiner

METHOD OF MAKING A KNITTED SHOE HAVING A TUBULAR KNITTED UPPER

CROSS-REFERENCE TO RELATED APPLICATION

This application claims priority of Taiwanese Patent Application No. 106133631, filed on Sep. 29, 2017.

FIELD

The disclosure relates to a method of making a shoe, more particularly to a method of making a knitted shoe having a tubular knitted upper.

BACKGROUND

In recent years, knitted shoes have gradually replaced shoes made of plastic and leather uppers and have become the mainstream of today. In comparison with the conventional shoes, the knitted shoes can provide a more comfortable feeling of wear, and will not permit the user's feet to feel discomfort due to large area of pressure and friction. Hence, the knitted shoes are gradually favored by the consumers. The knitted shoe currently available in the market has an outer layer of the upper mainly made by a flat weaving machine. However, the process of making the outer layer of the upper using the flat knitting machine has weaving parts with complicated and varied shapes, so that the speed of the entire production is slow. Moreover, since the cost of the flat weaving machine is expensive, the manufacturing cost of this process is also high.

SUMMARY

Therefore, an object of the present disclosure is to provide a method of making a knitted shoe that has a fast production speed and that has a low manufacturing cost.

According to this disclosure, a method of making a knitted shoe includes the steps of:

(A) preparing a tube member made of a knitted material, the tube member having a tube main body, the tube main body having a front end formed with a first opening, and a rear end formed with a second opening;

(B) closing the first opening to form a front joined part on the front end of the tube main body, and then cutting away a portion of the tube main body that extends forwardly of the front joined part;

(C) cutting an oval shaped opening in an outer peripheral surface of the tube main body in proximity to the front joined part and closing the oval shaped opening to form a side joined part extending in a direction transverse to the front joined part;

(D) preparing a three-dimensional rigid foam sleeve and sleeving the foam sleeve on a shoe last, the foam sleeve defining an accommodation space that has a foot-insertion opening;

(E) adhering the tube main body to an outer surface of the foam sleeve so as to form a tubular knitted upper;

(F) placing the shoe last together with the tubular knitted upper in an oven for heating;

(G) removing the shoe last together with the tubular knitted upper from the oven;

(H) adhering a sole to a bottom side of the tubular knitted upper; and (I) removing the shoe last from the tubular knitted upper.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
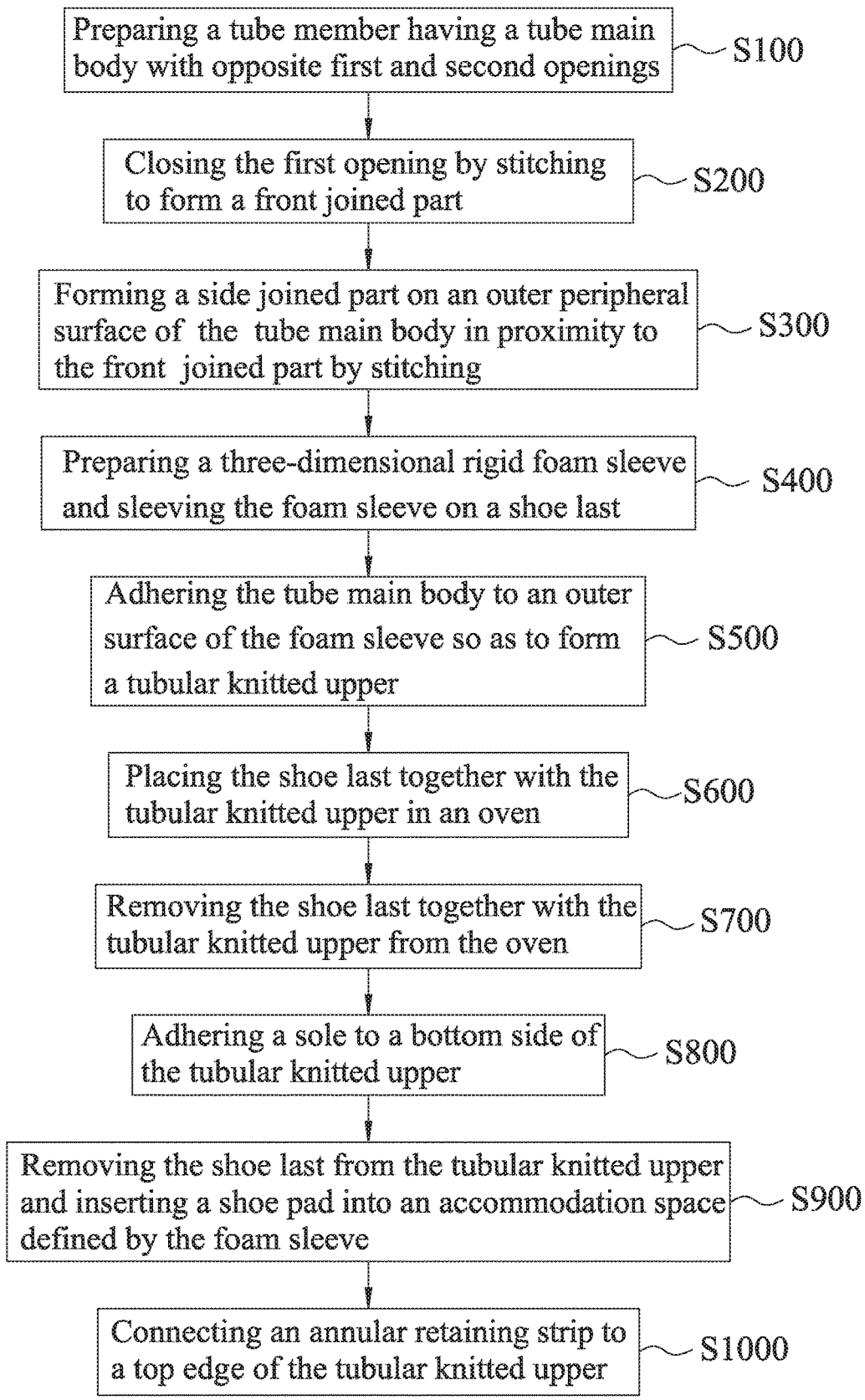
FIG. 1 is a flow diagram, illustrating the steps involved in a method of making a knitted shoe according to the first embodiment of this disclosure.

Before the present disclosure is described in greater detail with reference to the accompanying embodiments, it should be noted herein that like elements are denoted by the same reference numerals throughout the disclosure.

Referring to FIG. 1, a method of making a knitted shoe 100 according to the first embodiment of the present disclosure is shown to include steps S100 to S1000.

Figure 2:
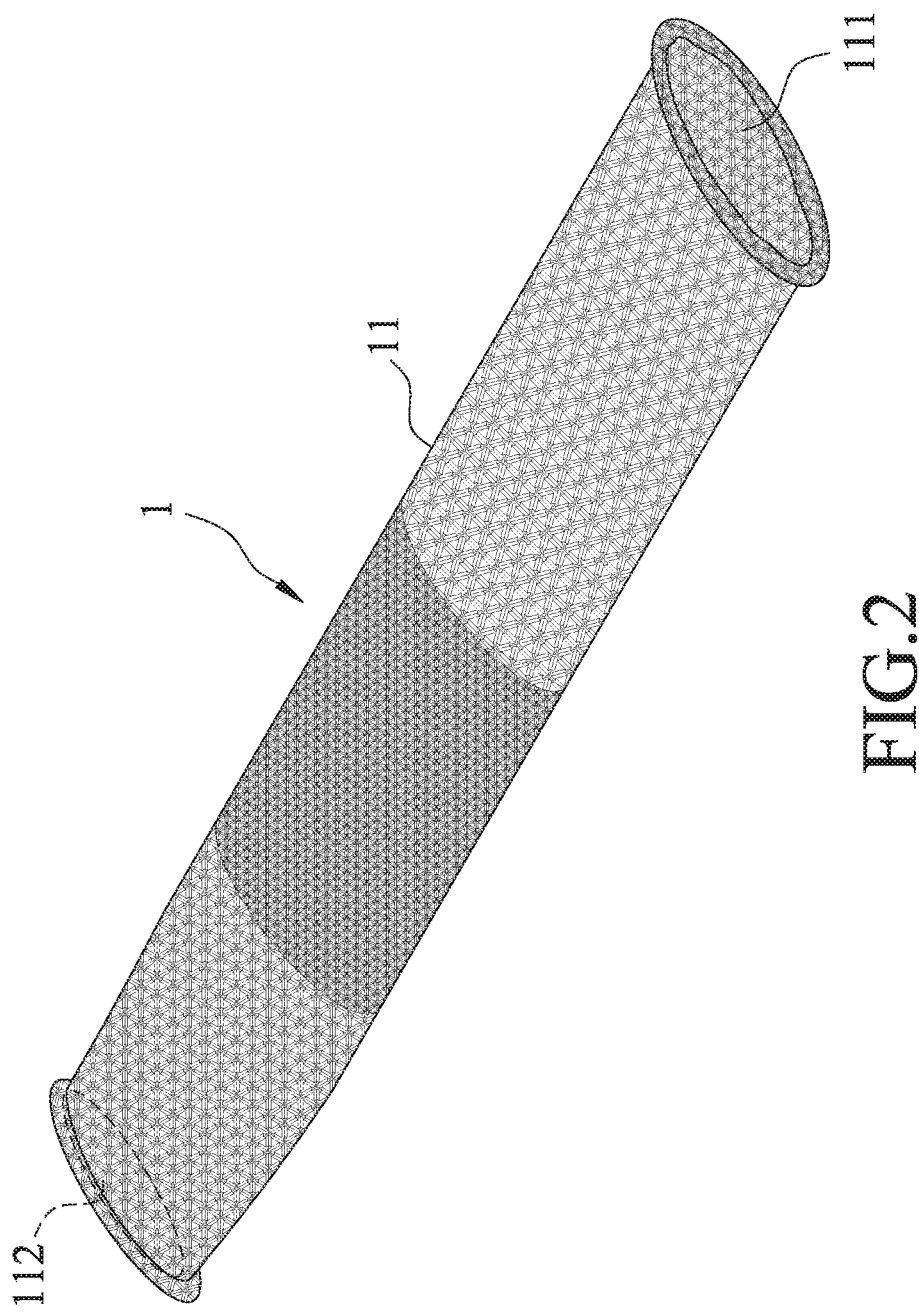
FIG. 2 is a perspective view of a tube member of the first embodiment.

In step S100, referring to FIG. 2, a tube member 1 made of a knitted material is prepared. The tube member 1 has a tube main body 11. The tube main body 11 has a front end formed with a first opening 111, and a rear end formed with a second opening 112.

Figure 3:
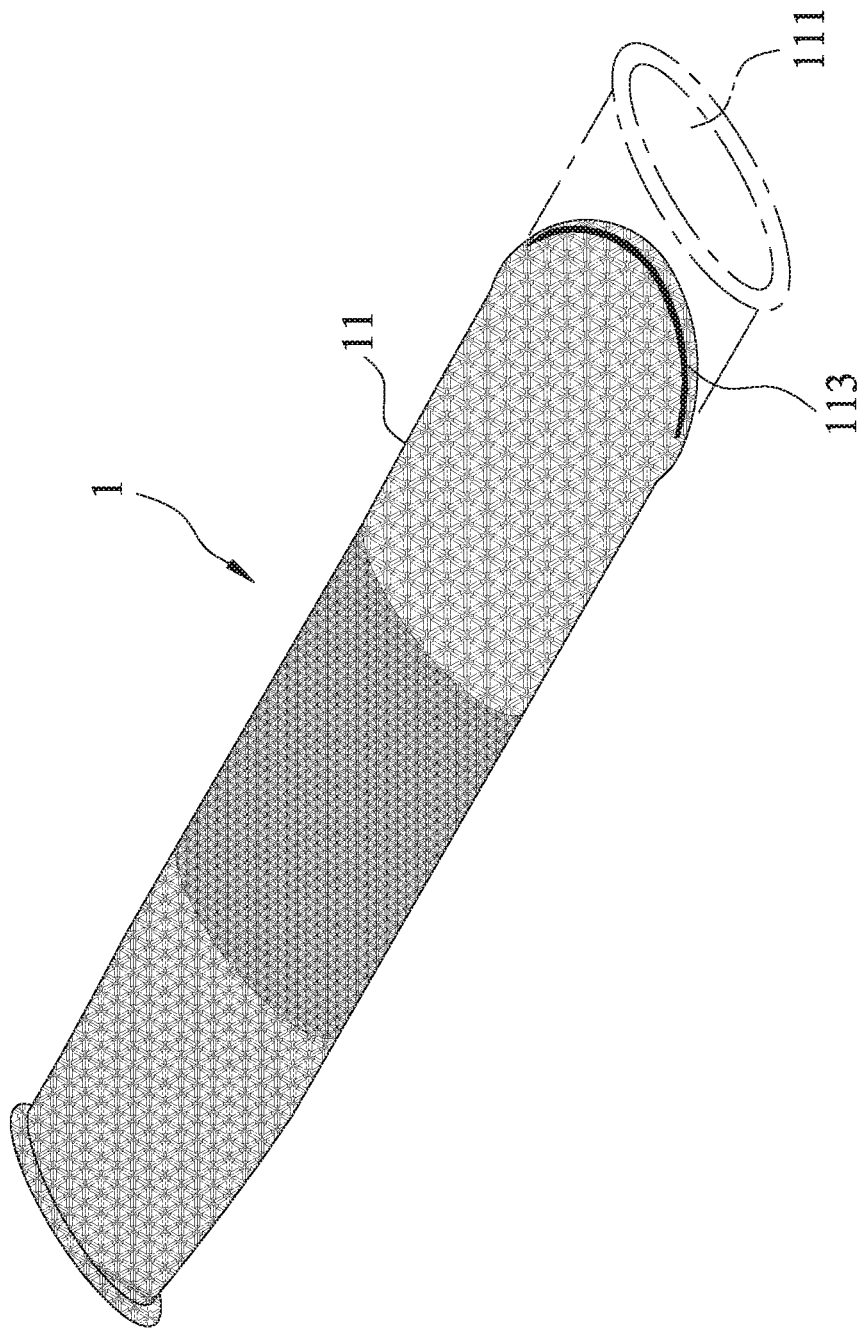
FIG. 3 is a view similar to FIG. 2, but illustrating a first opening of a tube main body of the tube member being closed to form a front joined part.

In step S200, referring to FIG. 3, the first opening 111 is closed by stitching to form a front joined part 113, and a portion of the tube main body 11 that extends forwardly of the front joined part 113 is cut away, so that the front joined part 113 has a substantially semicircular shape when viewed from above. The semicircular front joined part 113 is configured to match the shape of the front ends of the toes of a user.

Figure 4:
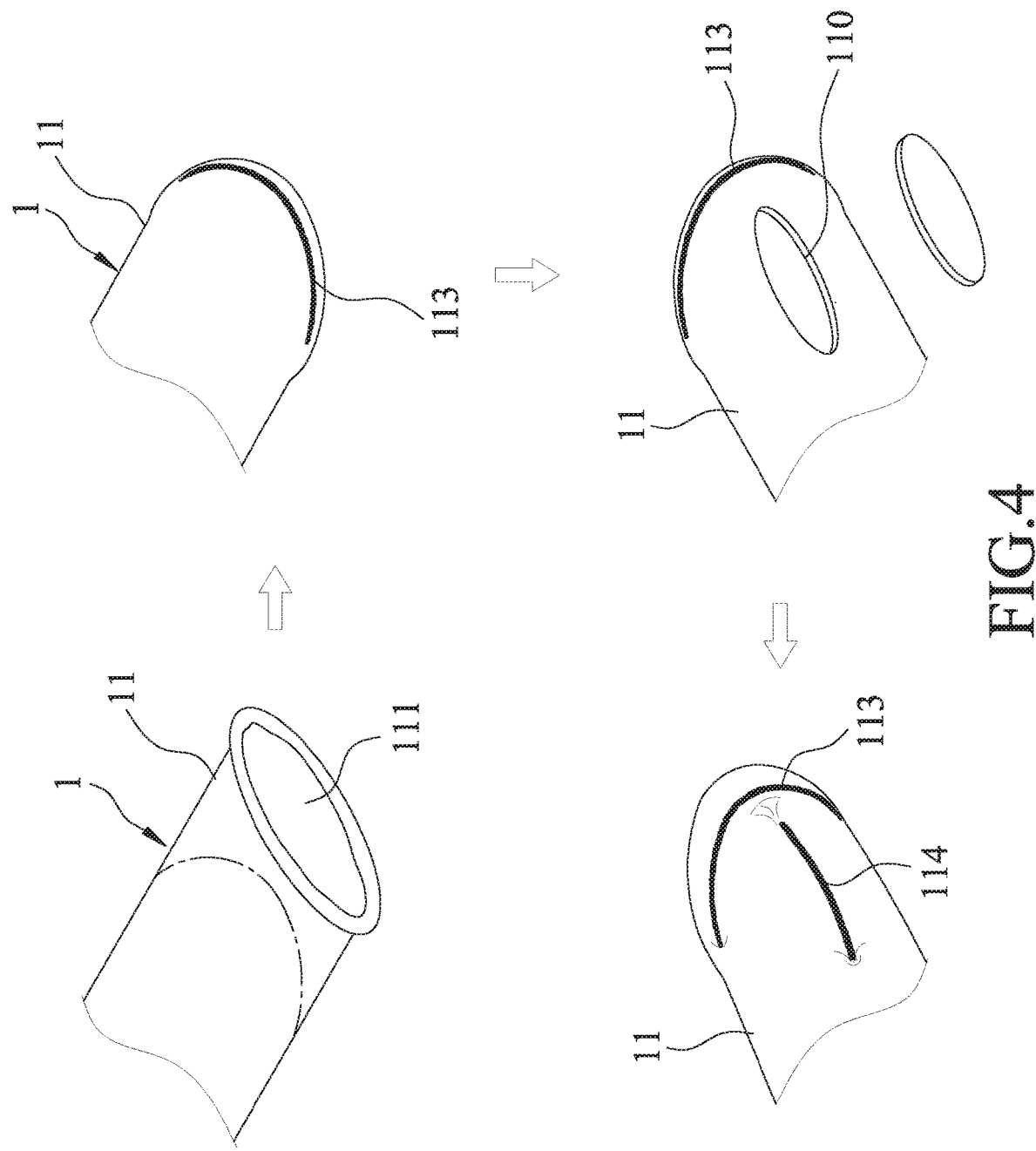
FIG. 4 is a perspective view, illustrating some of the steps involved in the method of the first embodiment.
Figure 5:
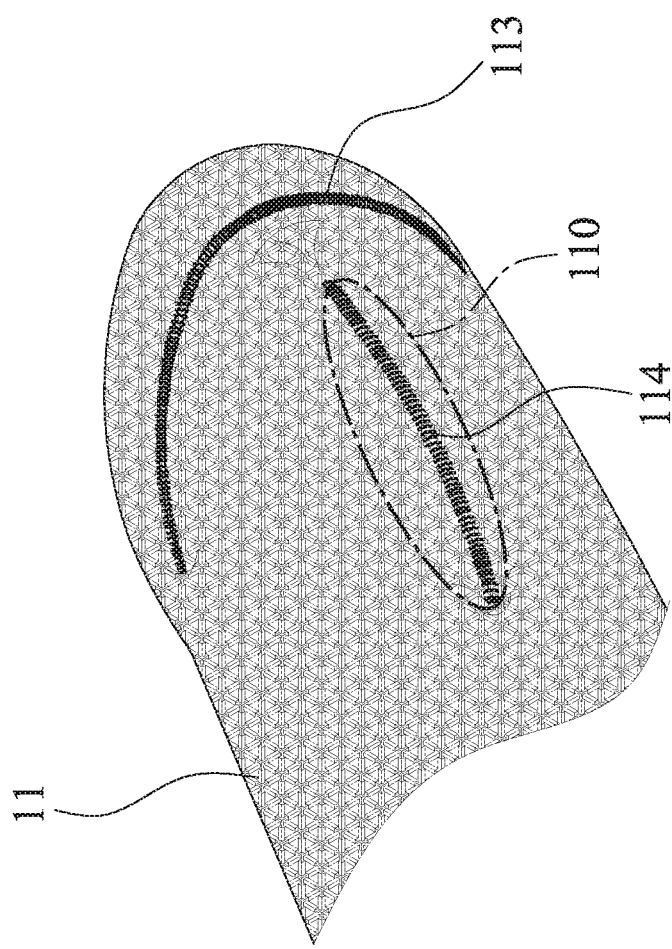
FIG. 5 is a fragmentary perspective view, illustrating the tube main body of the tube member being formed with a side joined part proximate to the front joined part.
Figure 6:
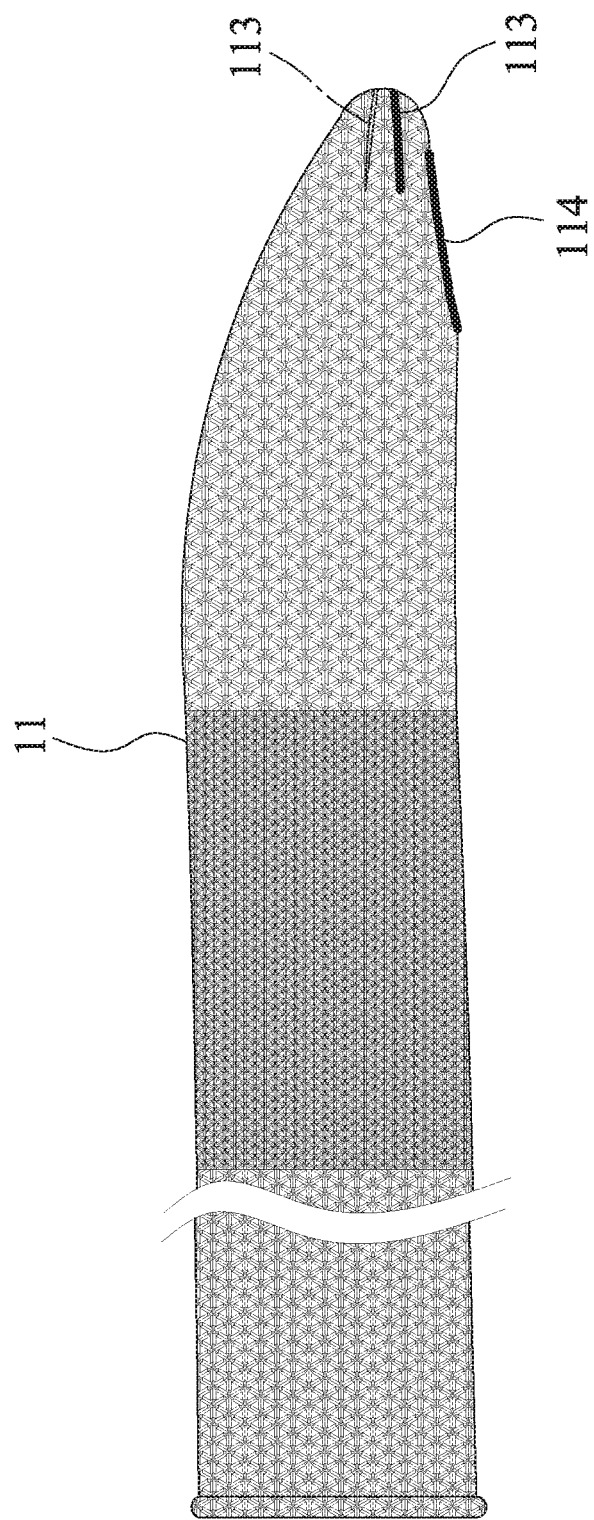
FIG. 6 is a schematic side view of the tube main body of the first embodiment.

In step S300, referring to FIGS. 4 to 6, an outer peripheral surface of the tube main body 11 is cut to form an oval shaped opening 110 proximate to the front joined part 113. The oval shaped opening 110 is closed by stitching to form a side joined part 114 extending in a direction transverse to the front joined part 113. The front joined part 113 is adjusted so as to be located above the side joined part 114 to facilitate subsequent covering and hiding thereof. The side joined part 114 is formed to constrict the front end of the tube main body 11, so that the subsequently made knitted shoe 100 can be fitted to the anterior sole of the user's foot and can have an aesthetic appearance.

Figure 7:
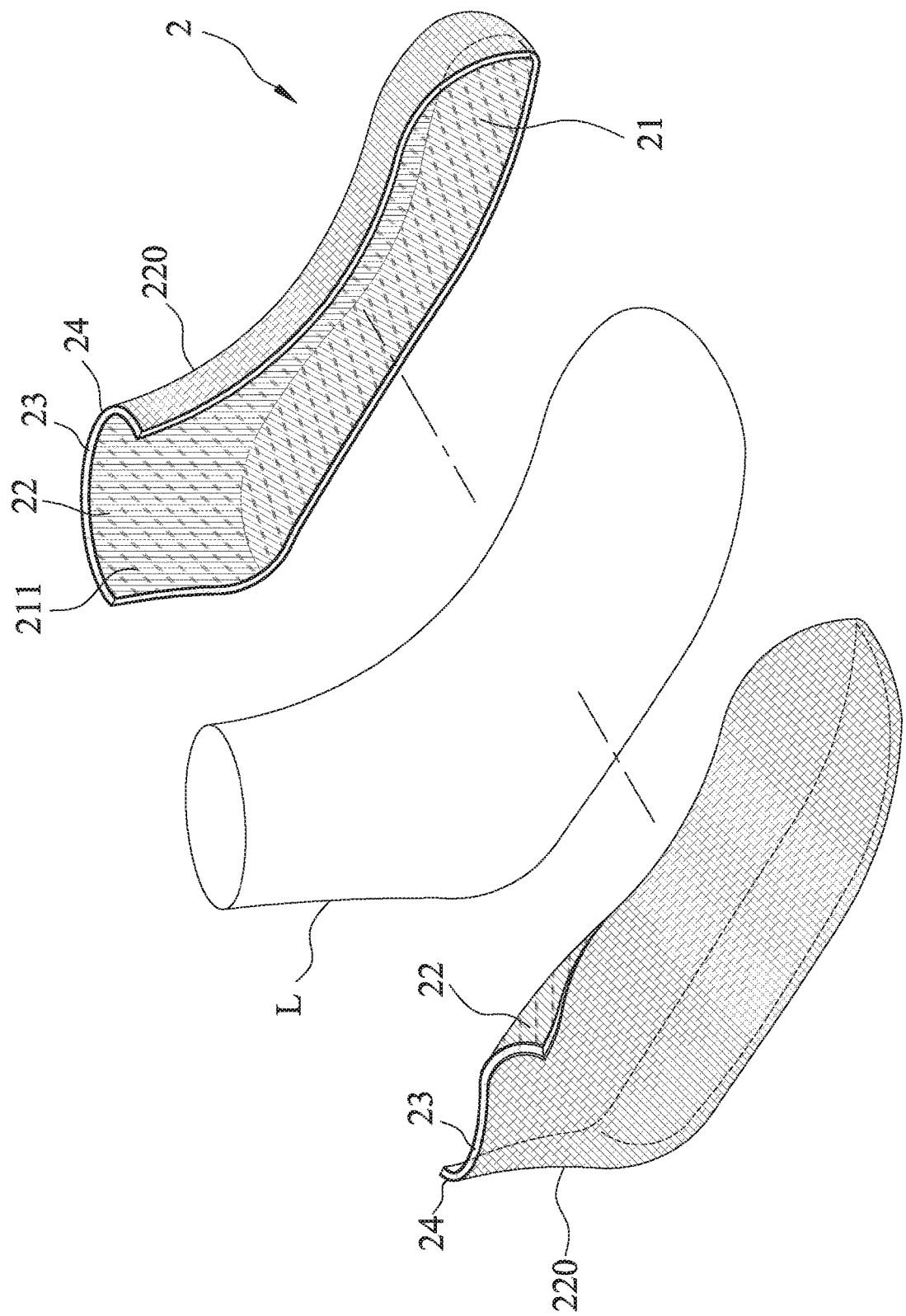
FIG. 7 is an exploded perspective view of a foam sleeve of the first embodiment and a shoe last.

In step S400, referring to FIG. 7, a three-dimensional rigid foam sleeve 2 is prepared. The foam sleeve 2 defines an accommodation space 21 having a foot-insertion opening 211. The foam sleeve 2 is made by cutting a layered structure 220 into two pieces. The two layered structures 220 are trimmed to complement each other in shape. Each layered structure 220 is trimmed to have the shape of a shoe half. The layered structures 220 are stitched together to form the foam sleeve 22. Each layered structure 220 includes an inner lining layer 22, an intermediate foam layer 23 and an outer fabric layer 24 integrally connected as one piece by adhesive. Specifically, the intermediate foam layer 23 is adhered between the inner lining layer 22 and the outer fabric layer 24 by two adhesive layers 25 (see FIG. 10), and has a thickness of 1 to 5 mm. Next, the foam sleeve 22 is sleeved on a shoe last (L).

Figure 8:
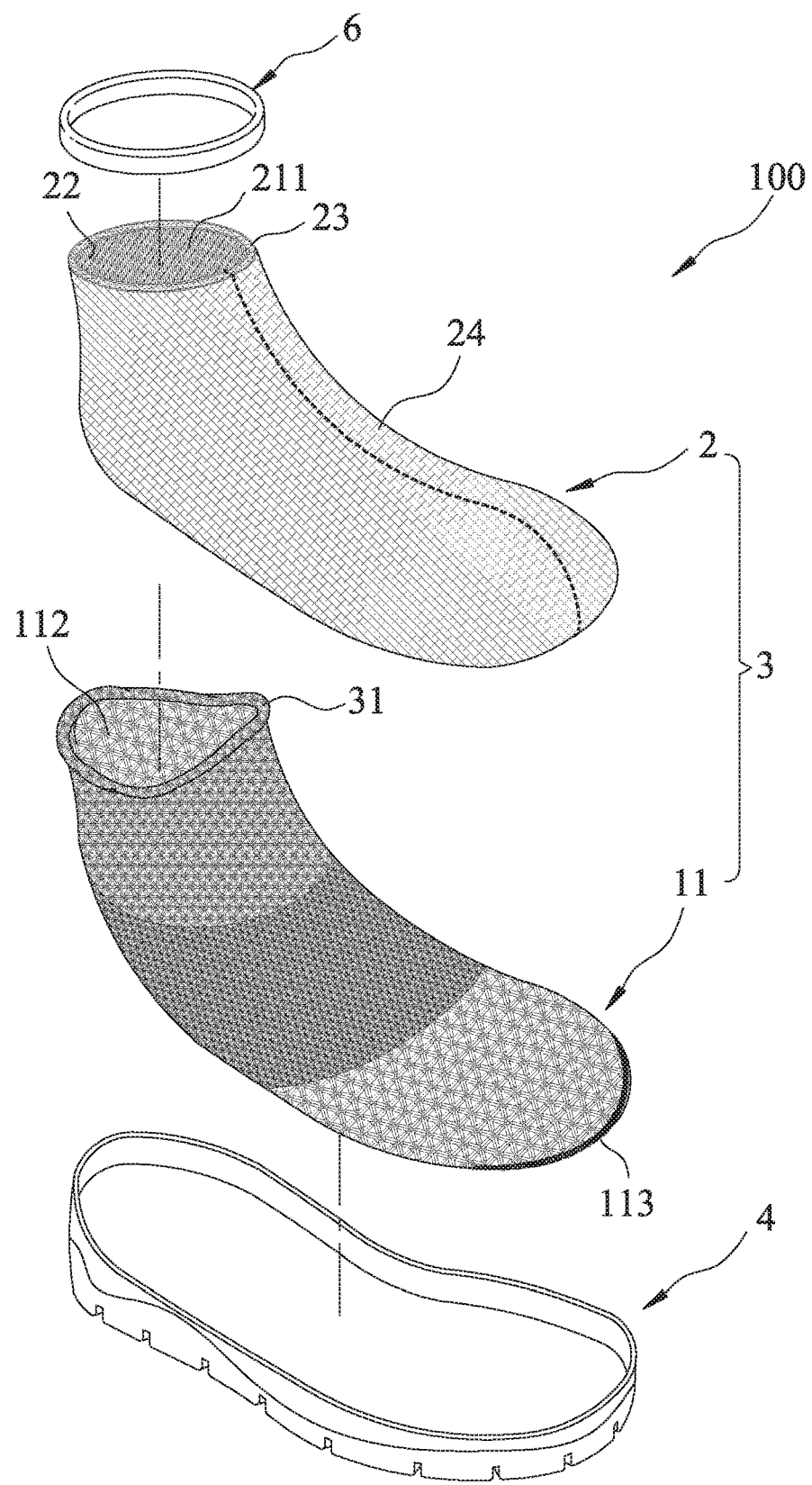
FIG. 8 is an exploded perspective view of the knitted shoe of the first embodiment.
Figure 9:
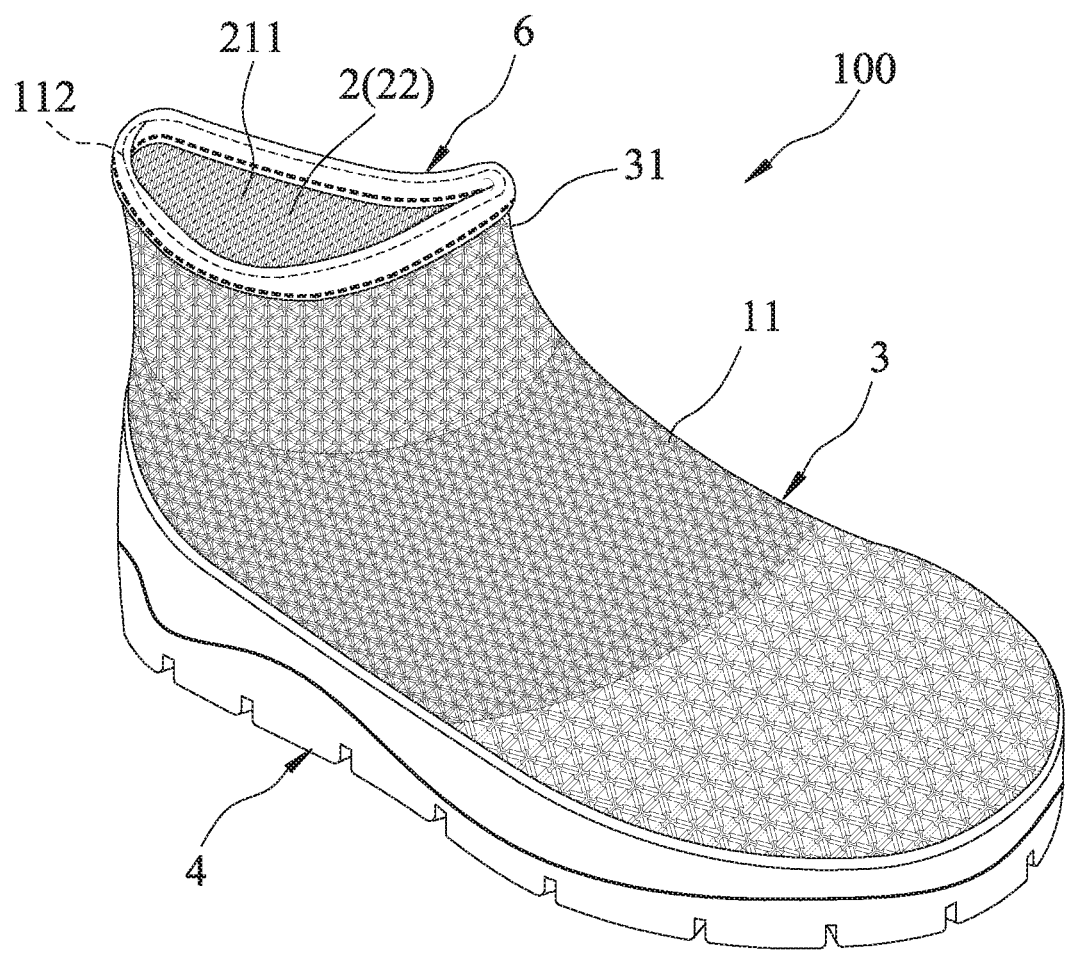
FIG. 9 is an assembled perspective view of the knitted shoe of the first embodiment.
Figure 10:
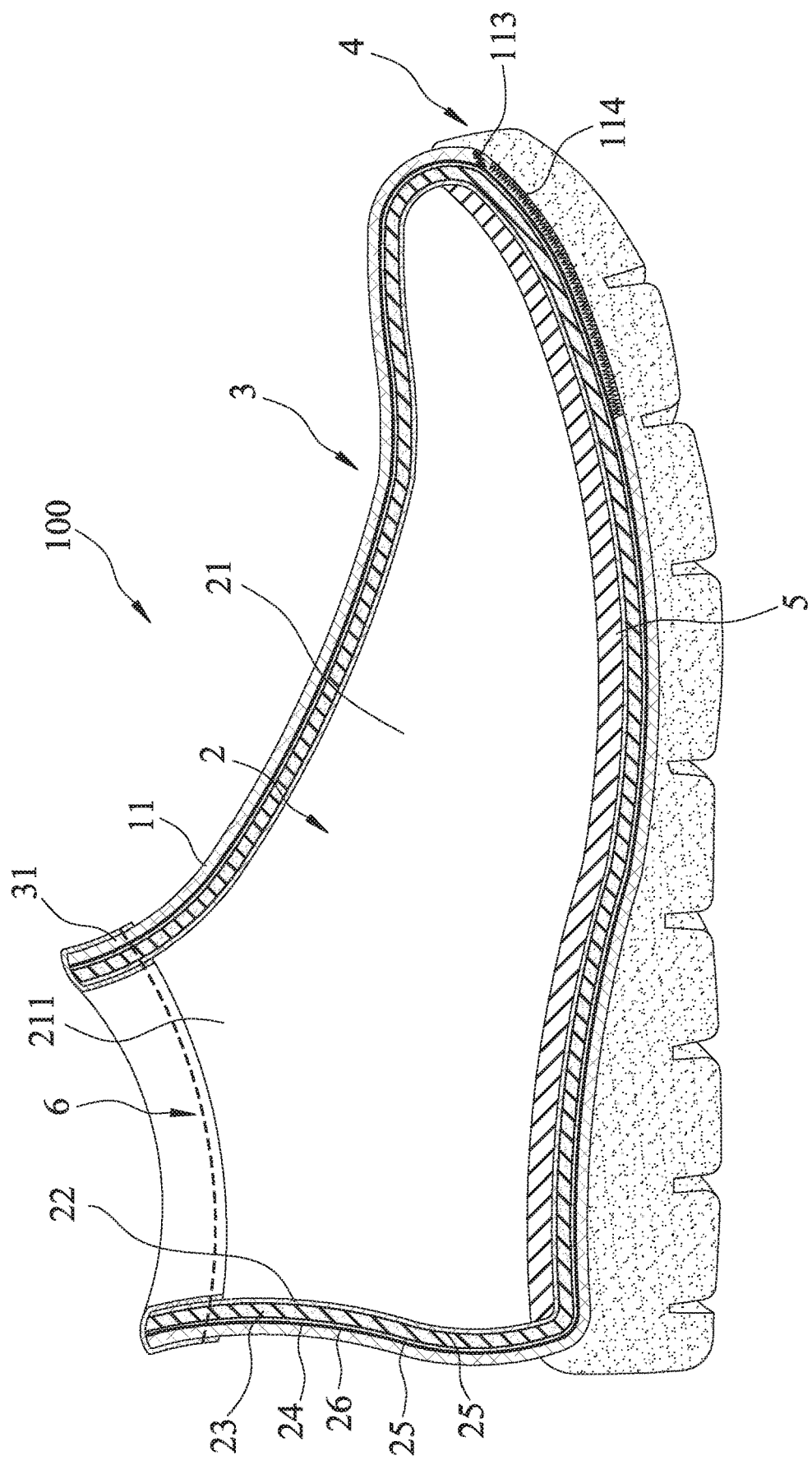
FIG. 10 is an assembled sectional side view of the knitted shoe of the first embodiment.

In step S500, referring to FIGS. 8 to 10, an outer surface of the outer fabric layer 24 of the foam sleeve 2 is coated with an adhesive layer 26, and the tube main body 11 is sleeved on the foam sleeve 2 through the second opening 112 thereof and is adhered to the outer surface of the outer fabric layer 24, thereby forming a tubular knitted upper 3.

In step S600, the shoe last (L) (see FIG. 7) together with the tubular knitted upper 3 is placed in an oven (not shown) and is heated to a temperature ranging from 100 to 180° C. so as to cure the adhesive layers 25 and the adhesive layer 26.

In step S700, after the adhesive layers 25 and the adhesive layer 26 are cured, the shoe last (L) together with the tubular knitted upper 3 is removed from the oven.

In step S800, a sole 4 is adhered to a bottom side of the tubular knitted upper 3.

In step S900, the shoe last (L) is removed from the tubular knitted upper 3, and a shoe pad 5 (see FIG. 10) is inserted into the accommodation space 21 via the foot-insertion opening 211.

In step S1000, an annular retaining strip 6 is stitched to a top edge 31 of the tubular knitted upper 3. The retaining strip 6 surrounds the foot-insertion opening 211, and prevents separation of portions of the foam sleeve 2 and the tube main body 11 that are proximate to the foot-insertion opening 211, and at the same time to achieve an aesthetic effect. The knitted shoe 100 having the tubular knitted upper 3 is thus obtained.

Since the tube member 1 has a simple shape, it can be quickly made using a circular knitting machine, and the subsequent steps merely involve stitching and cutting to complete an outer layer of the upper of the knitted shoe 100, that is, the tubular knitted upper 3. The step of sleeving and adhering the tube main body 11 on and to the foam sleeve 2 to form the tubular knitted upper 3 and the step of adhering the sole 4 to the bottom side of the tubular knitted upper 3 follow thereafter, thereby completing the making of the knitted shoe 100 having the tubular knitted upper 3. In comparison with using the flat woven machine to make the outer layer of the upper of the knitted shoe which involves many and complicated processes, the present disclosure, which uses the circular knitting machine to make the outer layer of the upper 3 of the knitted shoe 100, can effectively shorten the entire processing time. Moreover, the cost of the circular knitting machine is cheaper than the flat woven machine, so that the manufacturing cost of the knitted shoe 100 can be significantly reduced up to more than 50%. As such, the knitted shoe 100 so produced has a price more competitive in the market.

Figure 11:
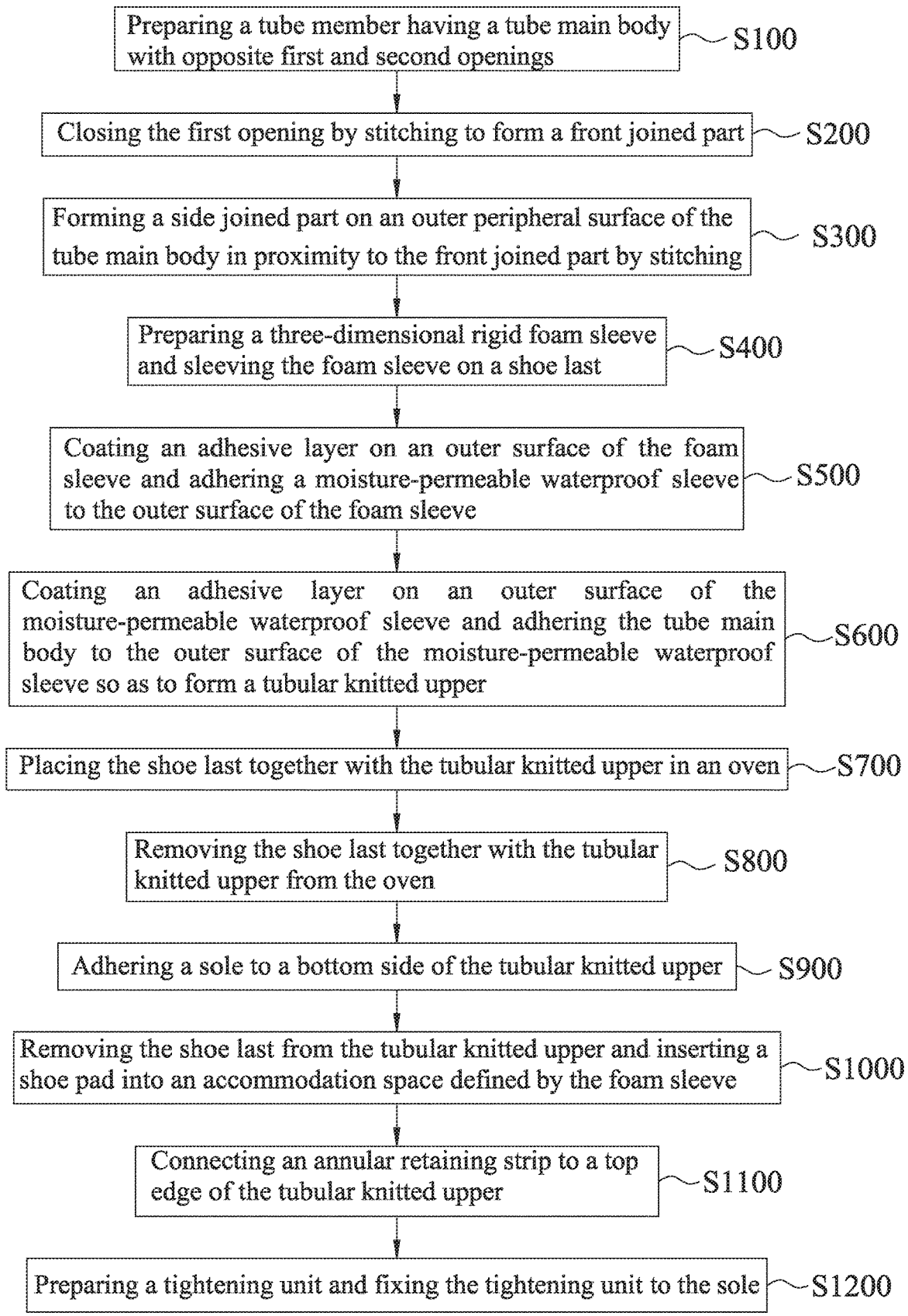
FIG. 11 is a flow diagram, illustrating the steps involved in a method of making a knitted shoe according to the second embodiment of this disclosure.

Referring to FIG. 11, a method of making a knitted shoe 100' according to the second embodiment of the present disclosure is shown to include steps S100 to S1200. Steps S100 to S400 are identical to those described in the first embodiment.

Figure 12:
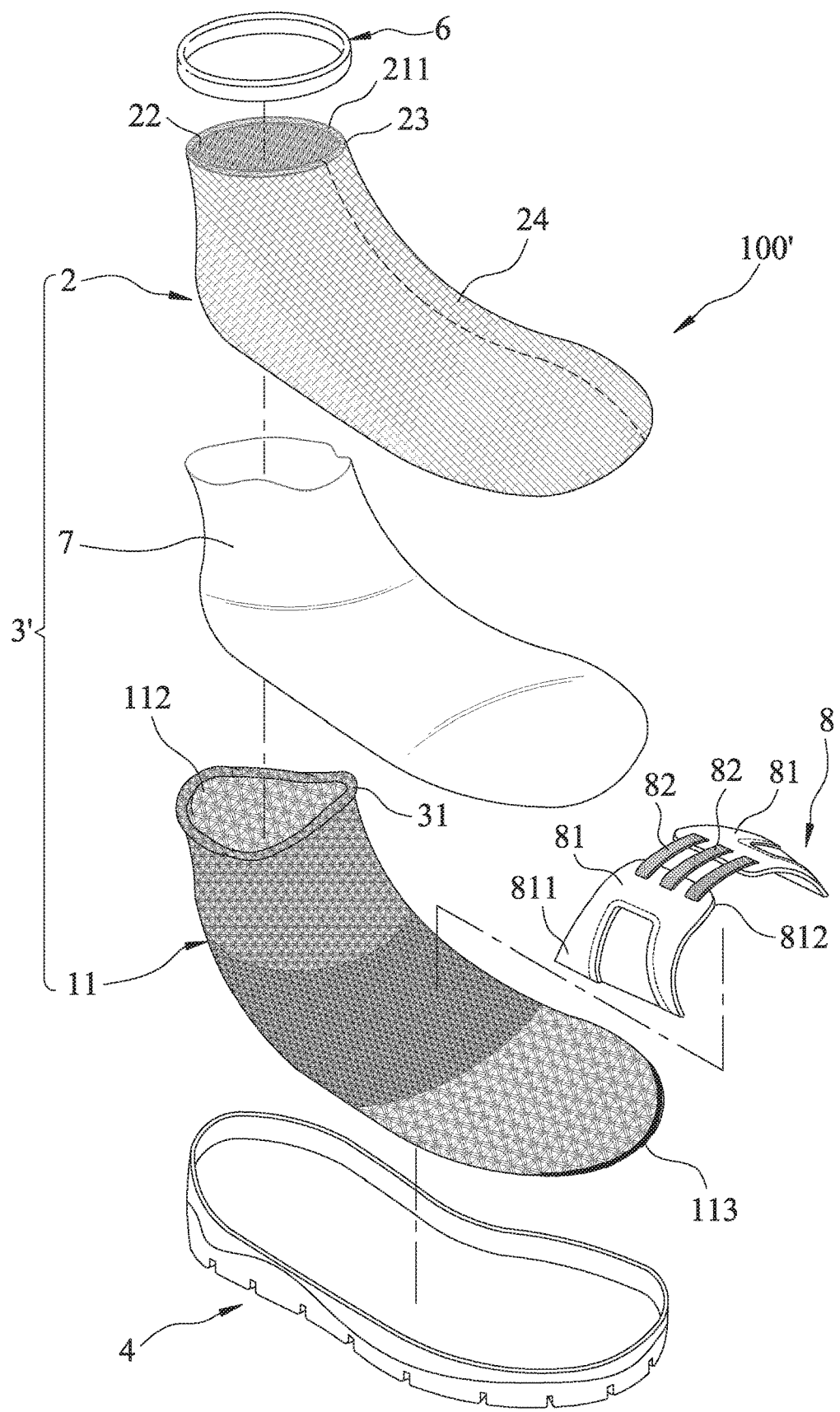
FIG. 12 is an exploded perspective view of the knitted shoe of the second embodiment.
Figure 13:
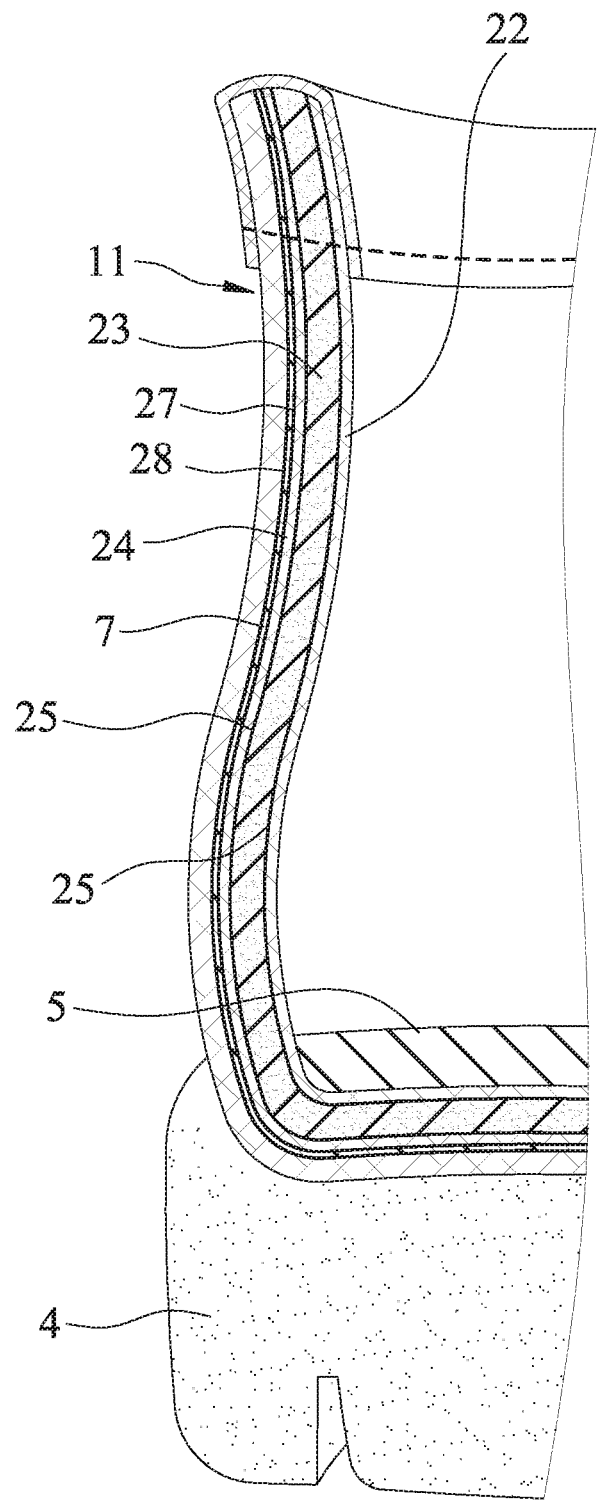
FIG. 13 is a fragmentary assembled sectional side view of the knitted shoe of the second embodiment.

In step S500, referring to FIGS. 12 and 13, an outer surface of the outer fabric layer 24 of the foam sleeve 2 is coated with an adhesive layer 27, and a moisture-permeable waterproof sleeve 7 is adhered to the outer surface of the outer fabric layer 24. The water pressure resistance of the moisture-permeable waterproof sleeve 7 is not less than 3000 mm $H_2O$, and the moisture permeability thereof is not less than 3000 g/m$^2$/24 hr.

In step S600, an outer surface of the moisture-permeable waterproof sleeve 7 is coated with an adhesive layer 28 (see FIG. 13), and the tube main body 11 is adhered to the outer surface of the moisture-permeable waterproof sleeve 7, thereby forming a tubular knitted upper 3'.

In step S700, the shoe last (L) (see FIG. 7) together with the tubular knitted upper 3' is placed in an oven (not shown) and is heated to a temperature ranging from 100 to 180° C. so as to cure the adhesive layers 25 (see FIG. 10), the adhesive layer 27 and the adhesive layer 28.

In step S800, after the adhesive layers 25, 27 and 28 are cured, the shoe last (L) together with the tubular knitted upper 3' is removed from the oven.

In step S900, a sole 4 (see FIG. 12) is adhered to a bottom side of the tubular knitted upper 3'.

In step S1000, the shoe last (L) is removed from the tubular knitted upper 3', and a shoe pad 5 (see FIG. 13) is inserted into the accommodation space 21 via the foot-insertion opening 211.

In step S1100, an annular retaining strip 6 is stitched to a top edge 31 of the tubular knitted upper 3'. The retaining strip 6 surrounds the foot-insertion opening 211, prevents separation of portions of the foam sleeve 2 and the tube main body 11 that are proximate to the foot-insertion opening 211, and at the same time to achieve an aesthetic effect. The knitted shoe 100' having the tubular knitted upper 3' is thus obtained.

Figure 14:
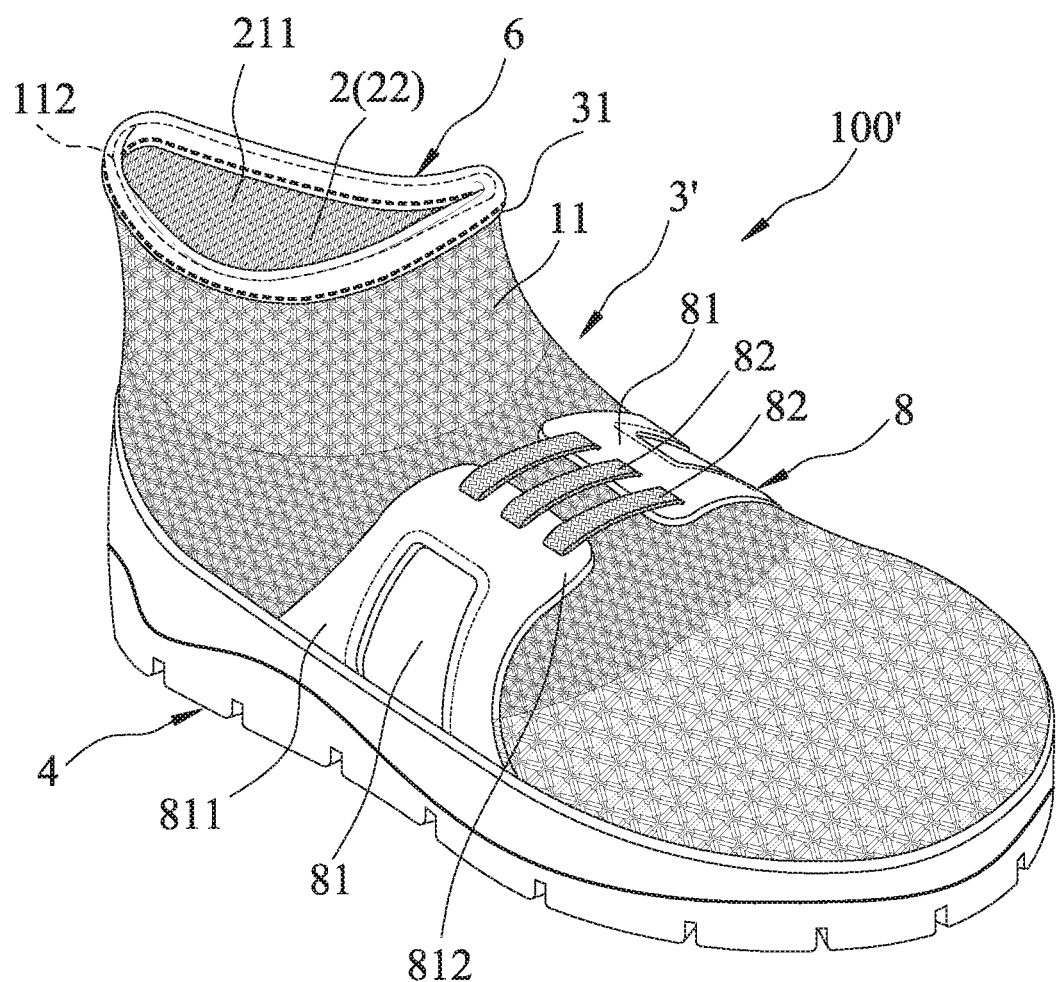
FIG. 14 is an assembled perspective view of the knitted shoe of the second embodiment.

In step S1200, referring to FIG. 14, in combination with FIG. 13, a tightening unit 8 is prepared. The tightening unit 8 includes a pair of tightening plates 81, and three tightening strips 82 connected between the tightening plates 81. Each tightening plate 81 has a connecting end portion 811, and a free end portion 812 opposite to the connecting end portion 811. The connecting end portions 811 of the tightening plates 81 are respectively adhered to left and right sides of the sole 4. The tightening strips 82 interconnect the free end portions 812 of the tightening plates 81 such that the tightening unit 8 is disposed across a vamp portion of the tubular knitted upper 3'. The tightening unit 8 can permit the knitted shoe 100' of this embodiment to tightly cover the user's foot.

It should be noted herein that step S900 and step S1200 can be performed simultaneously.

Hence, the second embodiment can also achieve effects of the first embodiment, and can further achieve the moisture-permeable and waterproof effects.

In sum, the method of making the knitted shoe 100, 100' according to this disclosure not only can shorten the processing time, but also can reduce the manufacturing cost. Therefore, the object of this disclosure can indeed be realized.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of making a knitted shoe, comprising:
(A) preparing a tube member made of a knitted material, the tube member having a tube main body, the tube main body having a front end formed with a first opening, and a rear end formed with a second opening;
(B) closing the first opening by stitching to form a front joined part on the front end of the tube main body, and then cutting away a portion of the tube main body that extends forwardly of the front joined part;
(C) cutting an oval shaped opening in an outer peripheral surface of the tube main body in proximity to the front joined part and closing the oval shaped opening by stitching to form a side joined part extending in a direction transverse to the front joined part, the oval shaped opening being located on a sole side of the tube main body;
(D) preparing a three-dimensional rigid foam sleeve and sleeving the foam sleeve on a shoe last, the foam sleeve defining an accommodation space that has a foot-insertion opening, the three-dimensional rigid foam sleeve being made by cutting a layered structure into two pieces of layered structures, and stitching together the two layered structures to form the foam sleeve, the layered structures complementing each other in shape, each of the layered structures having the shape of a shoe half;
(E) adhering the tube main body to an outer surface of the foam sleeve so as to form a tubular knitted upper;
(F) placing the shoe last together with the tubular knitted upper in an oven for heating;
(G) removing the shoe last together with the tubular knitted upper from the oven;
(H) adhering a sole to a bottom side of the tubular knitted upper; and
(I) removing the shoe last from the tubular knitted upper.

2. The method as claimed in claim 1, before step (E), further comprising the steps of:
(D1) coating an adhesive layer on the outer surface of the foam sleeve;
(D2) adhering a moisture-permeable waterproof sleeve to the outer surface of the foam sleeve; and
(D3) coating an adhesive layer on an outer surface of the moisture-permeable waterproof sleeve for subsequent bonding with the tube main body.

3. The method as claimed in claim 1, further comprising a step of coating an adhesive layer on the outer surface of the foam sleeve before step (E).

4. The method as claimed in claim 1, further comprising a step of connecting an annular retaining strip to a top edge of the tubular knitted upper after step (I), the annular retaining strip surrounding the foot-insertion opening.

5. The method as claimed in claim 1, further comprising the steps of:
(J) preparing a tightening unit, the tightening unit including a pair of tightening plates, and a plurality of tightening strips connected between the tightening plates, each of the tightening plates having a connecting end portion and a free end portion opposite to the connecting end portion, the tightening strips interconnecting the free end portions of the tightening plates; and
(K) fixing the connecting end portions of the tightening plates to left and right sides of the sole, respectively.

6. The method as claimed in claim 1, wherein the front joined part has a substantially semicircular shape when viewed from above.

7. The method as claimed in claim 1, wherein in step (F), the shoe last together with the tubular knitted upper is heated to a temperature ranging from 100 to 180° C.

8. The method as claimed in claim 1, further comprising a step of inserting a shoe pad into the accommodation space after step (I).

9. The method as claimed in claim 1, wherein each of the layered structures includes an inner lining layer, an intermediate foam layer and an outer fabric layer integrally connected as one piece by adhesive.

10. The method as claimed in claim 9, wherein the intermediate foam layer has a thickness of 1 to 5 mm.

* * * * *